(12) United States Patent
Gregory

(10) Patent No.: US 8,705,716 B2
(45) Date of Patent: Apr. 22, 2014

(54) INTERACTIVE CONTROL OF ALARM SYSTEMS BY TELEPHONE INTERFACE USING AN INTERMEDIATE GATEWAY

(75) Inventor: Michael Gregory, Carrollton, TX (US)

(73) Assignee: Numerex Corp., Atlanta, GA (US)

(*) Notice: Subject to any disclaimer, the term of this patent is extended or adjusted under 35 U.S.C. 154(b) by 0 days.

(21) Appl. No.: 13/456,662

(22) Filed: Apr. 26, 2012

(65) Prior Publication Data

US 2012/0275588 A1 Nov. 1, 2012

Related U.S. Application Data

(60) Provisional application No. 61/479,605, filed on Apr. 27, 2011.

(51) Int. Cl.
*H04M 1/56* (2006.01)

(52) U.S. Cl.
USPC ............ 379/142.01; 379/142.07; 379/142.16; 709/224; 709/230; 709/246

(58) Field of Classification Search
USPC ........... 379/102.02–102.06, 142.01; 709/224, 709/230, 246
See application file for complete search history.

(56) References Cited

U.S. PATENT DOCUMENTS

| | | |
|---|---|---|
| 4,465,904 A | 8/1984 | Gottsegen et al. |
| 4,692,742 A | 9/1987 | Raizen et al. |
| 4,918,717 A | 4/1990 | Bissonnette et al. |
| 5,134,644 A | 7/1992 | Garton et al. |
| 5,195,126 A | 3/1993 | Carrier et al. |
| 5,365,568 A | 11/1994 | Gilbert |
| 5,400,011 A | 3/1995 | Sutton |
| 5,463,595 A | 10/1995 | Rodhall |
| 5,568,475 A | 10/1996 | Doshi et al. |
| 5,736,927 A | 4/1998 | Stebbins et al. |
| 5,796,633 A | 8/1998 | Burgess et al. |
| 5,808,547 A | 9/1998 | Carney |
| 5,838,223 A | 11/1998 | Gallant et al. |
| 5,877,684 A | 3/1999 | Lu |
| 5,923,731 A | 7/1999 | McClure |
| 5,940,474 A | 8/1999 | Ruus |
| 6,075,451 A | 6/2000 | Lebowitz et al. |
| 6,215,404 B1 | 4/2001 | Morales |
| 6,243,373 B1 | 6/2001 | Turock |
| 6,272,212 B1 | 8/2001 | Wulforst et al. |

(Continued)

OTHER PUBLICATIONS

International Search Report from PCT/US2012/035375, Nov. 23, 2012.

(Continued)

*Primary Examiner* — Joseph J Nguyen
(74) *Attorney, Agent, or Firm* — King & Spalding

(57) ABSTRACT

An interface for interactive control of alarm systems using an intermediate gateway. A request for access to an account for interactive alarm system control is received from a remote device by an intermediate gateway. The request for access from the remote device is authenticated by the intermediate gateway based on an authentication parameter. After authenticating, the intermediate gateway identifies an alarm system and attributes of the alarm system associated with the request for access. Here, for example, the intermediate gateway identifies the operating characteristics for remote access to the alarm system. Further, the interactive gateway may receive a prompt from the remote device. Based on the prompt, the intermediate gateway may communicate with the alarm system according to its identified attributes and in response to the prompt, to query or update at least one setting of the alarm system.

23 Claims, 6 Drawing Sheets

(56) References Cited

U.S. PATENT DOCUMENTS

| | | |
|---|---|---|
| 6,288,642 B1 | 9/2001 | Dohrmann |
| 6,311,072 B1 | 10/2001 | Barclay et al. |
| 6,369,705 B1 | 4/2002 | Kennedy |
| 6,381,307 B1 | 4/2002 | Jeffers et al. |
| 6,400,265 B1 | 6/2002 | Saylor et al. |
| 6,438,124 B1 | 8/2002 | Wilkes et al. |
| 6,452,490 B1 | 9/2002 | Garland et al. |
| 6,493,435 B1 | 12/2002 | Petricoin |
| 6,553,100 B1 | 4/2003 | Chen et al. |
| 6,574,480 B1 | 6/2003 | Foladare et al. |
| 6,577,234 B1 | 6/2003 | Dohrmann |
| 6,603,845 B2 | 8/2003 | Jensen et al. |
| 6,661,340 B1 | 12/2003 | Saylor et al. |
| 6,683,526 B2 | 1/2004 | Bellin |
| 6,829,478 B1 | 12/2004 | Layton et al. |
| 6,831,557 B1 | 12/2004 | Hess |
| 6,870,906 B2 | 3/2005 | Dawson |
| 6,928,148 B2 | 8/2005 | Simon et al. |
| 6,965,313 B1 | 11/2005 | Saylor et al. |
| 6,973,165 B2 | 12/2005 | Giacopelli et al. |
| 7,002,462 B2 | 2/2006 | Welch |
| 7,009,519 B2 | 3/2006 | Leonard et al. |
| 7,103,152 B2 | 9/2006 | Naidoo et al. |
| 7,113,090 B1 | 9/2006 | Saylor et al. |
| 7,119,609 B2 | 10/2006 | Naidoo et al. |
| 7,245,703 B2 | 7/2007 | Elliot et al. |
| 7,262,690 B2 | 8/2007 | Heaton et al. |
| 7,406,710 B1 | 7/2008 | Zellner et al. |
| 7,429,921 B2 | 9/2008 | Seeley et al. |
| 7,440,554 B2 | 10/2008 | Elliot et al. |
| 7,542,721 B1 | 6/2009 | Bonner et al. |
| 7,558,379 B2 | 7/2009 | Winick |
| 7,593,512 B2 | 9/2009 | Elliot et al. |
| 7,593,513 B2 | 9/2009 | Muller |
| 7,613,278 B2 | 11/2009 | Elliot et al. |
| 7,619,512 B2 | 11/2009 | Trundle et al. |
| 7,633,385 B2 | 12/2009 | Cohn et al. |
| 7,653,186 B2 | 1/2010 | Hosain et al. |
| 7,734,020 B2 | 6/2010 | Elliot et al. |
| 7,751,540 B2 | 7/2010 | Whitfield et al. |
| 7,778,394 B2 | 8/2010 | Small et al. |
| 7,820,841 B2 | 10/2010 | Van Toor et al. |
| 7,848,505 B2 | 12/2010 | Martin et al. |
| 7,853,200 B2 | 12/2010 | Blum et al. |
| 7,855,635 B2 | 12/2010 | Cohn et al. |
| 7,911,341 B2 | 3/2011 | Raji et al. |
| 7,920,841 B2 | 4/2011 | Martin et al. |
| 7,920,842 B2 | 4/2011 | Martin et al. |
| 7,920,843 B2 | 4/2011 | Martin et al. |
| 7,961,088 B2 | 6/2011 | Watts et al. |
| 8,022,807 B2 | 9/2011 | Martin et al. |
| 8,073,931 B2 | 12/2011 | Dawes et al. |
| 8,116,724 B2 | 2/2012 | Peabody |
| 8,214,494 B1 | 7/2012 | Slavin |
| 8,335,842 B2 | 12/2012 | Raji et al. |
| 8,350,694 B1 | 1/2013 | Trundle et al. |
| 8,456,293 B1 | 6/2013 | Trundle et al. |
| 8,473,619 B2 | 6/2013 | Baum et al. |
| 8,478,844 B2 | 7/2013 | Baum et al. |
| 8,493,202 B1 | 7/2013 | Trundle et al. |
| 8,520,072 B1 | 8/2013 | Slavin et al. |
| 8,525,665 B1 | 9/2013 | Trundle et al. |
| 2002/0103898 A1* | 8/2002 | Moyer et al. .............. 709/224 |
| 2002/0147982 A1 | 10/2002 | Naidoo et al. |
| 2002/0176581 A1 | 11/2002 | Bilgic et al. |
| 2002/0177428 A1 | 11/2002 | Menard et al. |
| 2003/0027547 A1 | 2/2003 | Wade |
| 2003/0071724 A1 | 4/2003 | D'Amico |
| 2004/0005044 A1* | 1/2004 | Yeh .......................... 379/142.01 |
| 2004/0086088 A1 | 5/2004 | Naidoo et al. |
| 2004/0086093 A1 | 5/2004 | Schranz |
| 2005/0099893 A1 | 5/2005 | Jyrinki |
| 2006/0023848 A1 | 2/2006 | Mohler et al. |
| 2006/0176167 A1 | 8/2006 | Dohrmann |
| 2007/0115930 A1 | 5/2007 | Reynolds et al. |
| 2007/0143838 A1* | 6/2007 | Milligan et al. ............ 726/15 |
| 2007/0155412 A1 | 7/2007 | Kalsukis |
| 2008/0079561 A1 | 4/2008 | Trundle et al. |
| 2008/0084291 A1 | 4/2008 | Campion et al. |
| 2008/0117029 A1 | 5/2008 | Dohrmann et al. |
| 2008/0191863 A1 | 8/2008 | Boling |
| 2008/0204219 A1 | 8/2008 | Cohn et al. |
| 2008/0309449 A1 | 12/2008 | Martin et al. |
| 2008/0309450 A1 | 12/2008 | Martin et al. |
| 2008/0311878 A1 | 12/2008 | Martin et al. |
| 2008/0311879 A1 | 12/2008 | Martin et al. |
| 2009/0017757 A1 | 1/2009 | Koga et al. |
| 2009/0213999 A1 | 8/2009 | Farrand et al. |
| 2009/0248967 A1* | 10/2009 | Sharma et al. ............ 711/103 |
| 2009/0264155 A1 | 10/2009 | Nakayama et al. |
| 2009/0274104 A1 | 11/2009 | Addy |
| 2010/0007488 A1 | 1/2010 | Sharma et al. |
| 2010/0052890 A1 | 3/2010 | Trundle et al. |
| 2010/0121948 A1* | 5/2010 | Procopio ................... 709/224 |
| 2010/0277271 A1 | 11/2010 | Elliot et al. |
| 2010/0289643 A1 | 11/2010 | Trundle et al. |
| 2010/0289644 A1 | 11/2010 | Slavin et al. |
| 2011/0065414 A1 | 3/2011 | Frenette |
| 2011/0169628 A1 | 7/2011 | Elliot |
| 2012/0027010 A1 | 2/2012 | Elliot et al. |
| 2012/0250833 A1 | 10/2012 | Smith et al. |
| 2012/0250834 A1 | 10/2012 | Smith et al. |
| 2013/0189946 A1 | 7/2013 | Swanson |
| 2013/0194091 A1 | 8/2013 | Trundle |
| 2013/0215266 A1 | 8/2013 | Trundle |
| 2013/0234840 A1 | 9/2013 | Trundle |

OTHER PUBLICATIONS

U.S. Appl. No. 13/939,460, Harvey Elliot et al.
U.S. Appl. No. 14/039,573, Michael Gregory.
U.S. Appl. No. 14/039,821, Michael Gregory.
U.S. Appl. No. 14/050,655, Harvey Elliot et al.

* cited by examiner

INTERACTIVE CONTROL OF ALARM SYSTEMS BY TELEPHONE INTERFACE USING AN INTERMEDIATE GATEWAY

CROSS-REFERENCE TO RELATED APPLICATION

This application claims the benefit of U.S. Provisional Application No. 61/479,605, filed Apr. 27, 2011, the entire contents of which is hereby incorporated herein by reference.

TECHNICAL FIELD

The present invention generally relates to a system, apparatus, and method for interactive control of alarm systems using an intermediate gateway and, particularly, to interactive control of alarm systems using an intermediate gateway that provides a common interface between various remote devices and alarm systems.

BACKGROUND

Various alarm systems have been manufactured and placed into service at many locations for some time. Other than detecting fire and break-in events, many alarm systems include additional functionalities. For example, some alarm systems include remote access features, permitting additional flexibility in operation. These alarm systems that include remote access features generally permit a user to establish a connection to the alarm system over a telephone line, enter a password or PIN number to gain access to the settings and status of the alarm system, and accept commands to change settings of the alarm system.

However, the remote access protocols and procedures vary from alarm system to alarm system, especially for alarm systems manufactured by different manufacturers. Thus, the method for establishing a remote access connection to one alarm system may not be useful for establishing a remote access connection to another alarm system. These differences generally inhibit the adoption and use of remote access, because no remote access standard protocol is available.

Additionally, the protocols and procedures for establishing a remote access connection to an alarm system and instructing the alarm system to update settings and provide status information may appear relatively cumbersome and/or difficult for users. For example, the procedure may include several steps that must be performed in a certain order, require certain communications equipment such as modems, and require the knowledge of particular access and command codes. These requirements also generally inhibit the adoption and use of remote access, because the protocols and procedures for establishing remote access may appear relatively difficult or confusing to users.

The embodiments described herein are directed to addressing the problems discussed above by providing a common interface between various remote devices and alarm systems.

SUMMARY OF THE INVENTION

In certain exemplary embodiments, methods for interactive control of alarm systems are described. The methods may include receiving a request for access to an account for interactive alarm system control from a remote device. The remote device may include a smart-phone, computer, tablet computing device, or any other computing device, for example. After receiving the request for access, the methods described herein may further include authenticating the request for access from the remote device based on an authentication parameter. In various embodiments, the authentication parameter may include information uniquely identifying and associating a user with an account for interactive control of an alarm system.

After authenticating, the methods described herein may further include identifying an alarm system and attributes of the alarm system associated with the request for access. Here, for example, the intermediate gateway identifies the operating characteristics for remote access to the alarm system. In other aspects, the methods may include receiving a prompt from the remote device. Based on the prompt, the methods may further include communicating with the alarm system according to its identified attributes and in response to the prompt, to query or update at least one setting of the alarm system.

In other aspects and embodiments, the methods described herein may include establishing an account for interactive alarm system control. For example, establishing an account for interactive alarm system control may include receiving a model identifier of the alarm system. In certain aspects, the identifier of the alarm system is used to determine the operating characteristics of the alarm system for remote access, with reference to one or more databases. The methods for establishing an account for interactive alarm system control may further include retrieving operating characteristics of the alarm system based on the model identifier of the alarm system, and associating the operating characteristics of the alarm system to the account for interactive alarm system control. In further aspects, the methods may include receiving a communications address and an access code of the alarm system and associating the communications address and the access code of the alarm system to the account for interactive alarm system control.

In still other embodiments, a gateway for interactive control of alarm systems is described. In certain exemplary embodiments, the gateway includes a communications module and at least one processor. The communications module may be configured to receive, from a remote device, a request for access to an account for interactive alarm system control. Further, the communications module may further receive a prompt associated with an alarm system, wherein the prompt includes one of a query and a command.

In certain other aspects, the processor may be configured to authenticate the request for access from the remote device based on an authentication parameter. After the authentication, the processor may be further configured to identify the alarm system and attributes of the alarm system associated with the request for access. Here, for example, the intermediate gateway identifies the operating characteristics for remote access to the alarm system. In still other aspects of the gateway, the processor of the gateway may be further configured to direct the communications module to communicate with the alarm system according to the identified attributes of the alarm system and in response to the prompt, to query or update at least one setting of the alarm system These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the invention and the advantages thereof, reference is now made to the following description, in conjunction with the accompanying figures briefly described as follows.

The figures illustrate only exemplary embodiments and are therefore not to be considered limiting of scope, as other equally effective embodiments are within the scope and spirit of this disclosure.

DETAILED DESCRIPTION

In the following paragraphs, the present invention will be described in further detail by way of example with reference to the attached drawings. In the description, well known components, methods, and/or processing techniques are omitted or briefly described so as not to obscure the invention. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention may be implemented by a computer program executed by one or more processors, as described and illustrated. As would be apparent to one having ordinary skill in the art, the present invention may be implemented, at least in part, by computer-readable instructions in various forms, and the present invention is not intended to be limited to a particular set or sequence of instructions executed by the processor.

Figure 1:
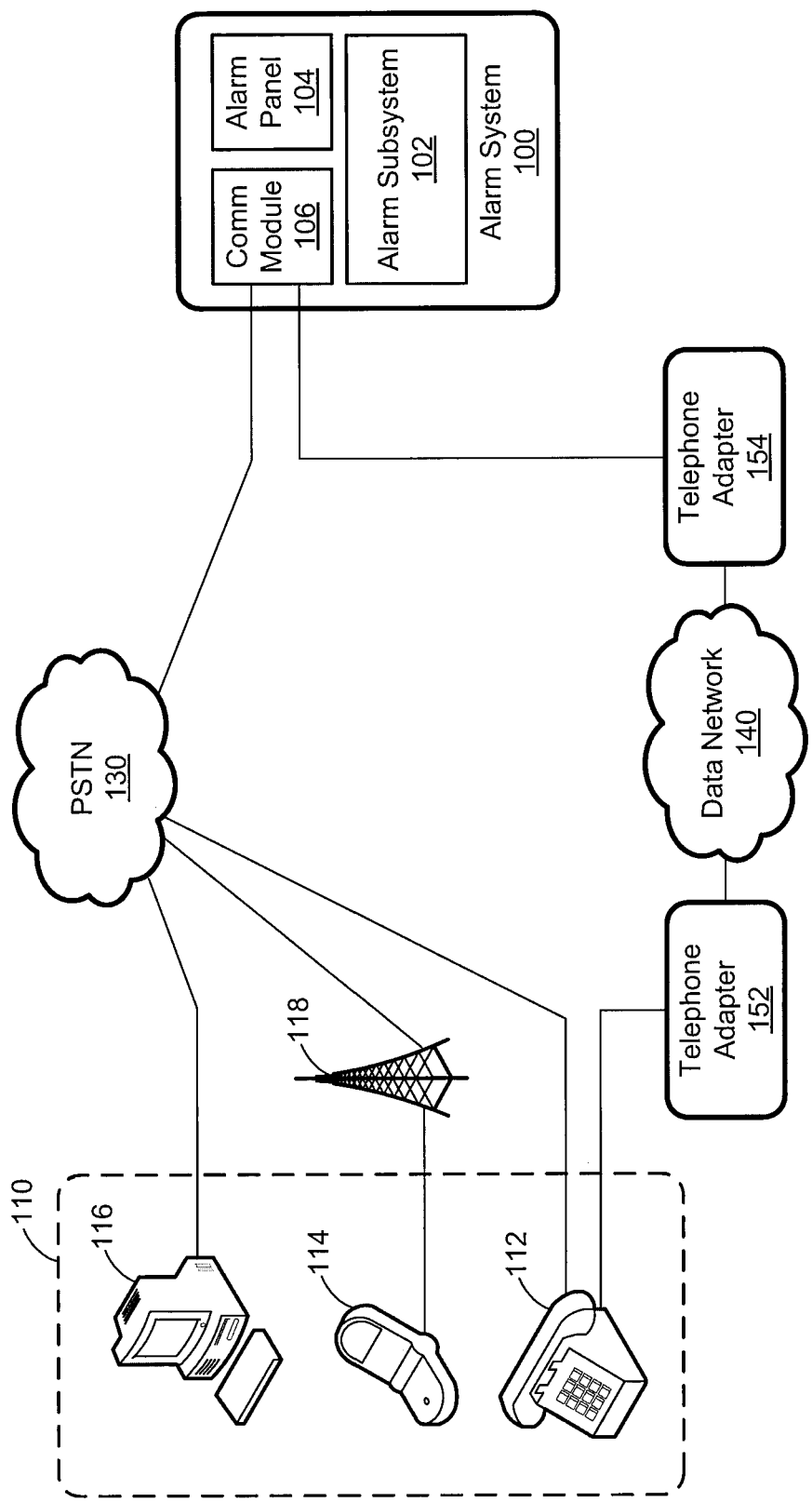
FIG. 1 illustrates a representative example of remote devices interfacing with an alarm system.

Turning now to the drawings, in which like numerals indicate like, but not necessarily the same, elements throughout, exemplary embodiments of the invention are described in detail. FIG. 1 illustrates a representative example of remote devices 110 interfacing with an alarm system 100. In FIG. 1, each of the remote devices 110 are able to communicate with the alarm system 100 via a communications network such as the public switched telephone network (PSTN) 130 or the packet-based data network 140, for example. As illustrated, the remote devices 110 may include a conventional telephone 112, a cellular or wireless telephone 114, or a computer 116, for example, among other devices.

The alarm system 100 includes an alarm subsystem 102, an alarm panel 104, and a communications module 106. The alarm subsystem 102 includes one or more sensors for detecting various types of alarm events and one or more sirens, among other components, for example. The alarm panel 104 comprises a display illustrating a current status of the alarm system 100 and a keypad including buttons and/or other controls to configure the alarm system 100, for example. Among other aspects, the communications module 106 is configured to accept an incoming call over the PSTN 130 and allow the entry of a personal identification number (PIN) or other access code to gain entry to the settings of the alarm system 100. In this context, when the alarm system 100 is connected to the PSTN to receive calls at a particular telephone number, a user may dial the telephone number via the PSTN 130 using the telephone 112 and be connected to the alarm system 100. In turn, the communication module 106 is configured to answer the call and, based on the entry of identification information such as a PIN, permit access to certain settings of the alarm system 100.

Alternatively, a user may dial the telephone number of the alarm system 100 using the cellular or wireless telephone 114 via the wireless tower 118 and the PSTN 130 and be connected to the alarm system 100. In turn, the communication module 106 is configured to answer the call and permit access to certain settings of the alarm system 100 based on the entry of identification information. In other cases, the telephone 112 may be interfaced with the data network 140 by the telephone adapters 152 and 154, to permit the telephone 112 to communicate with the alarm system 100 via the data network 140. Generally, the telephone adapters 152 and 154 include circuitry and associated firmware and/or software for interfacing a standard analog voice-band telephone with a VoIP network. In other words, the telephone adapters 152 and 154, in certain aspects, provide an interface similar to that of the PSTN for both the telephone 112 and the alarm system 100, allowing the telephone 112 and the communications module 106 to be communicatively coupled over the packet-based data network 140.

It is noted that the communications module 106, in various embodiments, may be configured to receive commands according to dual-tone multi-frequency (DTMF) tones generated based on a user's keystrokes on a dial pad of the telephone 112 or the cellular phone 114. Alternatively, the communications module 106 may be configured to receive commands according to modulated tones generated and communicated using a modem. For example, the communications module 106 may be configured to establish a connection using a standard modulation protocol of a modem such as the Bell 103 or 212A standards, or the V.21, V.22, V.23, V.29, V.32, V.32bis, V.34, or later standards or equivalents known in the art. Particularly, in situations where the communications module 106 is configured to receive commands according to modulation tones generated by a modem, the computer 116 includes a modem for establishing a connection to the alarm system 106 via the PSTN 130 and generating and communicating the tones.

Thus, a person with the proper access rights may call the alarm system 100 and update its settings or query its status, for flexible operation of the alarm system 100 from remote locations. However, because alarm systems similar to the alarm system 100 have been manufactured by various different manufacturers over many years, the protocols, procedures, sequences, commands, and settings for remote access to the alarm systems may differ among manufacturers and even among various different models of alarm systems from the same manufacturer. Further, certain protocols and connection requirements may be difficult for users to understand or remember. In other words, although an alarm system may permit remote access to settings and status information, it may be difficult for a user to remember the method of accessing, updating, and querying the alarm system. For example, the alarm system 100 may require a different sequence of DTMF tones for each of the following commands: arm, disarm, abort, and cancel. Further, the alarm system 100 may require those commands be entered at a particular time or according to a particular sequence. Thus, it may be difficult for a user to remember every sequence of commands for updating the settings of an alarm system. As such, users may be less likely to use the remote access features of the alarm system 100, especially if they perceive the features to be difficult or confusing to use.

In the context of the discussion above, new ways to remotely access the alarm system 100, especially those that leverage emerging technologies, would be desirable. For example, as new communications technologies such as cellular telephones that offer full-featured web browsers become relatively widespread, users may expect new systems for remote access to alarm system 100.

Figure 2:
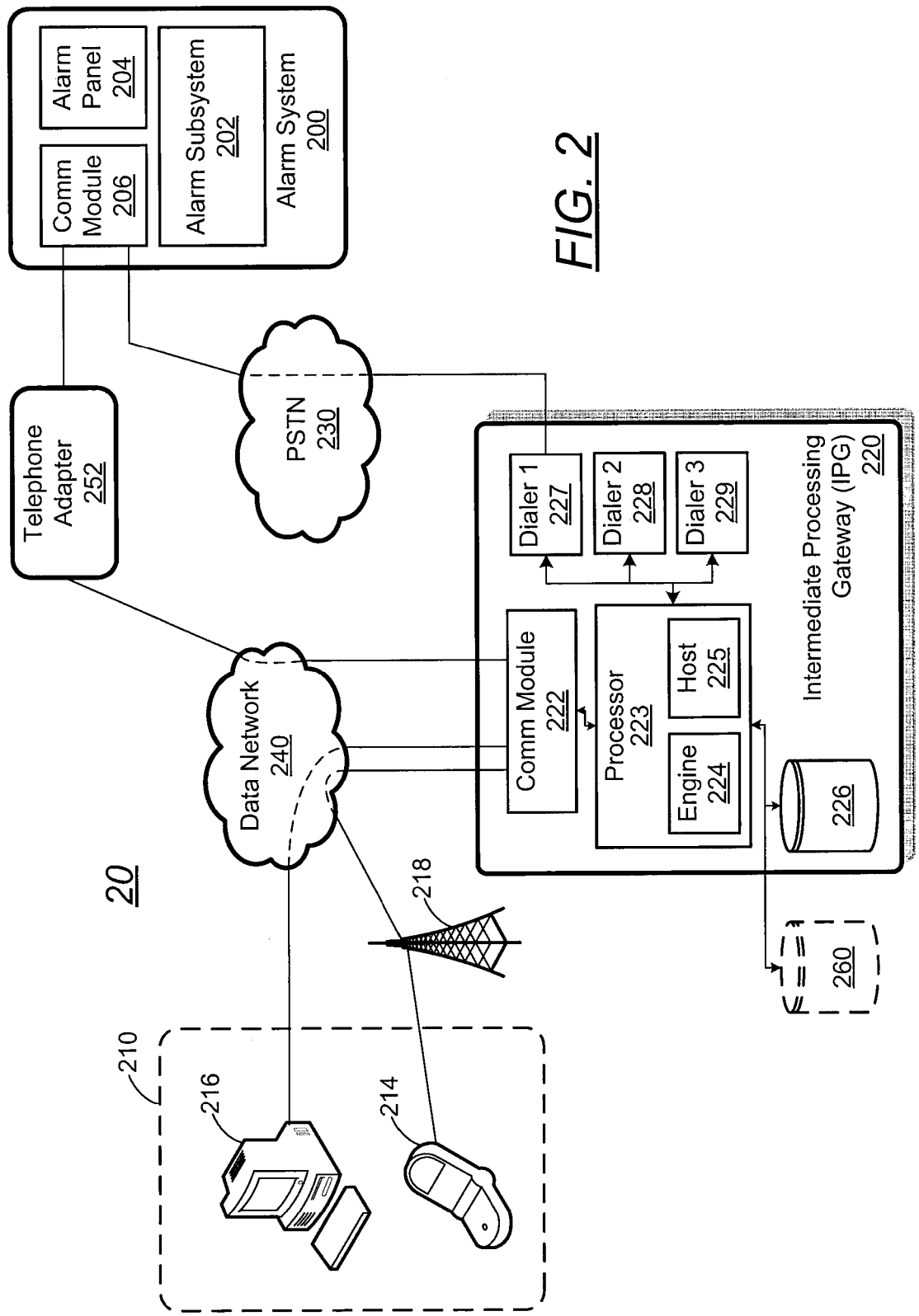
FIG. 2 illustrates an example embodiment of a system for interactive control of an alarm system.

Turning to FIG. 2, a system 20 for interactive control of an alarm system according to an exemplary embodiment is described. As illustrated, the system 20 includes one or more remote devices 210, an intermediate processing gateway (IPG) 220, and an alarm system 200. The remote devices 210 and the IPG 220 are communicatively coupled via the data network 240. The IPG 220 and the alarm system 200 are communicatively coupled via the PSTN 230 in one embodiment. In an alternative embodiment, the IPG 220 is communicatively coupled to the alarm system 200 via a combination of the data network 240 and a telephone adapter 252. When used in combination with the telephone adapter 252, the data network 240 provides a communications path between the IPG 220 and the alarm system 200 that appears as, at least to the alarm system 200, a connection over the PSTN.

In FIG. 2, a cellular phone 214 and a computer 216 are provided as examples of the remote devices 210. It is noted that the cellular phone 214 may comprise any type of cellular phone including a "smart-phone" that receives and transmits data over the packet-based data network 240 via the wireless or cellular tower 218. In certain aspects, the cellular phone 214 may permit users to access websites, e-mail, and other services over the packet-based data network 240. The computer 216 may comprise any type of computing device such as a desktop computer, a laptop computer, a tablet computer, or any other computing device suitable for communicating data over the packet-based data network 240. As generally used herein, a "remote device" comprises any computing device capable of providing access to websites, e-mail, and other services over the packet-based data network 240, without limitation.

Among various embodiments, the data network 240 comprises a packet-based private, public, or combination of private and public networks including, for example, the Internet. In certain embodiments, the data network 240 includes elements of wireless networks, such as the wireless or cellular tower 218. The PSTN 230 generally comprises the public switched telephone network, as understood by those having skill in the art.

The alarm system 200 comprises an alarm subsystem 202, an alarm panel 204, and a communications module 206. The alarm subsystem 202 includes one or more sensors for detecting various types of alarm events, such as fire, burglary, or medical emergency. As a non-limiting example subset of sensors for detecting fires and burglaries, the alarm subsystem 202 may include wired and/or wireless magnetic window and door sensors, glass-break sensors, infra-red sensors, motion sensors, smoke detectors, and carbon monoxide sensors. The alarm subsystem 202 may further comprise one or more sirens, speakers, and microphones for sounding an alarm, capturing sounds within a premises at which the alarm system 200 is installed, and amplifying a voice of an agent as described in further detail below.

The alarm panel 204 comprises a display illustrating a current status of the alarm system 200 and a keypad including buttons and/or other controls to configure the alarm system 200, for example. A user of the alarm system 200 is able to determine a current status of the alarm system 200 by viewing the display of the alarm panel 204. The user is also able to call for fire, police, and medical emergency personnel using the keypad of the alarm panel 204. The alarm system 200 further comprises other wiring and associated circuitry necessary for alarm systems as understood by those having ordinary skill in the art. In various embodiments and implementations of the system 20, the alarm system 200 may be installed at any location including a home or office building.

The communications module 206 comprises circuitry and associated firmware and/or software for establishing data and/or voice channels with other communications modules via the PSTN 230. Although the communications module 206 is illustrated in FIG. 2 as being communicatively coupled to both the PSTN 230 and the data network 240 (via the intermediate telephone adapter 252), in practice, the communications module 206 would generally be coupled to one of the PSTN 230 or the data network 240 alternatively.

In various embodiments, the communications module 206 comprises circuitry and associated firmware and/or software layers for a PSTN interface to establish communications via the PSTN 230 using one or more industry standard protocols. In embodiments where the alarm system 200 establishes communications over the data network 240, the telephone adapter 252 is provided as an interface to the data network 240 that mimics, in certain aspects, the PSTN 230, as discussed in further detail below. In operational aspects, the communications module 206 is configured to establish data and/or voice channels using one or more industry standard communications protocols and communications links. The communications module 206 may be configured to communicate over the PSTN 230 using various signaling techniques and protocols such as DTMF or modulated data signaling, for example. In certain embodiments, the communications module 206 may be configured to communicate using a standard modulation protocol of a modem such as the Bell 103 or 212A standards, or the V.21, V.22, V.23, V.29, V.32, V.32bis, V.34, or later standards or equivalents known in the art.

In operational aspects of the alarm system 200, the alarm system 200 is configured to detect an alarm event using one or more of the sensors of the alarm subsystem 202 or the alarm panel 204, and communicate associated alarm event data to a central alarm monitoring system or service. In one embodiment, the alarm system 200 may communicate alarm event data to the central alarm monitoring system or service in the alarm industry standard Contact ID format. According to additional "remote access" operational aspects, the alarm system 200 is further configured to answer a call received over the PSTN 230 or the data network 240 and, based on the entry of identification or security information, permit access to certain settings of the alarm system 200, as described in further detail below.

In embodiments where the alarm system 200 is installed to establish communications over the data network 240, the telephone adapter 252 is provided as an interface to the data network 240. As such, in certain embodiments, the telephone adapter 252 comprises circuitry and associated firmware and/or software configured to interface standard telephone calls over VoIP networks. For example, the telephone adapter 252 may include a packet-based data port, such as an RJ45 Ethernet port, and a voice-band telephone port, such as an RJ11 telephone port, for example. The RJ11 telephone port provides a port for communicatively coupling the telephone adapter 252 and the alarm system 200. The RJ45 telephone port provides a port for communicatively coupling the telephone adapter 252 to the data network 240. In other embodiments, the telephone adapter 252 may include other ports necessary for communicatively coupling the alarm system 200 and the data network 240. In embodiments where the telephone adapter 252 is installed within a home or office building along with the alarm system 200, the telephone adapter 252 may be connected to the data network 240 via one or more intermediate network modems, routers, and switches, as would be understood in the art. Among other aspects, the telephone adapter 252 is configured to open a communications channel between the alarm system 200 and the IPG 220 based on a call initiated by the IPG 220, as discussed in further detail below.

Turning to the IPG 220, IPG 220 includes, but is not limited to, a communications module 222, a processor 223, a memory 226, and dialers 227, 228, and 229. The communications module 222 is configured to communicate with the remote devices 210 and the alarm system 200 via the data network 240. When communicating with the alarm system 200 via the data network 240, the communications module 222 may rely on the telephone adapter 252 as noted above. In certain embodiments, the dialers 227, 228, and 229 include circuitry and associated firmware and/or software to communicate with the alarm system 200 via the PSTN using one or more of DTMF tones and modulated signaling of a Bell 103 or 212A standard modem. In various embodiments, the IPG 220 may include additional or fewer dialers.

The processor 223 comprises a general purpose processor that directs and coordinates the operations and functions of the IPG 220, as described in further detail below. As such, the processor 223 may direct and coordinate the actions and processes of the communications module 222 and the dialers 227, 228, and 229, among other components of the IPG 220, for example. In certain embodiments, the processor 223 may execute program instructions stored on the memory 226, directing the processor 223 to perform certain processes described in further detail below. The memory 226 comprises one or more computer-readable storage devices that store computer-executable program code as well as data related to alarm systems, interactive alarm system control accounts, and other associated data. Among the other associated data, the memory 226 may store data associated with the hardware and software configuration of the alarm system 200 and various other alarm systems, including manufacturer makes and models and remote access protocol information, for example.

In overall operation of the system 20, a remote device 210 communicates with the IPG 220 to access an account for interactive alarm system control. Particularly, using a remote device 210, a user is able to interface with the IPG 220 and establish an account for interactive control of an alarm system such as the alarm system 200. In this context, the IPG 220 establishes and provides accounts for interactive alarm system control for various different alarm systems and users. Each of the users may interface with IPG 220 using any remote device 210, and the IPG 220 provides a generally common interface for remote access to alarm systems, for relatively simple and flexible access to the settings and/or status of the alarm systems.

To provide an interface for access to an account for interactive alarm system control, the processor 223 includes an engine 224 and a host 225. The engine 224 is configured to dynamically generate one or more electronic documents for rendering by a remote device 210, based upon a request for access to an account for interactive alarm system control. For example, in certain embodiments and aspects, when a user accesses an account for interactive control of the alarm system 200 using a remote device 210, the engine 224 dynamically generates a web page or similar document representative of certain operating characteristics and settings of the alarm system 200, for a rendering by the remote device. Further, based on prompts, queries, and commands entered by the user at the remote device 210 and communications between the IPG 220 and the alarm system 200, the engine 224 dynamically updates the web page for rendering by the remote device 210. The host 225 is configured to serve the pages generated by the engine 224 to the remote device 210. It is noted that the pages generated by the engine 224 conform to a common interface, even for alarm systems that adhere to different operating characteristics for remote access. Further it is noted that the pages generated by the engine 224 generally include simple instructions and layouts to aide users in determining the available commands and settings available to any given alarm system for remote access. In this manner, the user is able to remotely access the alarm system 200 to update its settings and query its status, using a relatively simple, intuitive, and understandable interface. In one example embodiment, the IPG 220 may be accessed by any remote device 210 using a standard hypertext transfer protocol browser, as understood in the art.

When establishing an account for interactive alarm system control, the processor 223 is configured to query a user for authentication information such as a user name and password to uniquely identify the user for access to the account. Thus, when connecting to the IPG 220 and providing a request for access to the account, the IPG 220 may authenticate the request for access from the remote device 210 based on the authentication parameters determined during the establishment of the account. The authentication parameters thus serve to uniquely identify a user with his account. Further, when establishing the account for interactive alarm system control, the processor 223 is configured to query a user for a model number or other identifier of an alarm system to be associated with the account. For example, when establishing an account for interactive alarm system control for the alarm system 200, a user may provide the IPG 220 with an identifying model number, serial number, or other manufacturer model number of the alarm system 200, for example. Any information used to particularly identify the model of the alarm system 200 maybe provided by the user. In certain embodiments, the IPG 220 may provide the user with a list of alarm systems, so that the user's device may be selected among a list of known supported alarm systems.

After obtaining the information that uniquely identifies the alarm system 200, the intermediate processing gateway 220 accesses the memory 226 to ascertain the characteristics and attributes of the alarm system 200. For example, the characteristics and attributes may include the means and protocols relied upon by the alarm system 200 for remote access. In other words, via access to a database of known alarm systems stored in the memory 226, the IPG 220 ascertains whether the alarm system 200 is remotely accessed using DTMF tones or modulated signaling of a Bell 103 or 212A standard modem. Because alarm systems manufactured by different manufacturers are generally remotely accessed using different command sets and/or sequences and timings of commands, the IPG 220 ascertains the particular operating characteristics for remote access to any identified alarm system via access to the memory 226. In certain embodiments, the IPG 220 may access a third-party memory 260 to access operating characteristics of alarm systems not stored in the memory 226. In exemplary embodiments, the IPG 220 is able to retrieve the operating characteristics of any known alarm system via access to one or more databases among the memory 226 and/or the third-party memory 260.

Once the operating characteristics of the alarm system 200 have been retrieved from the memory 226, the operating characteristics are associated to the account for interactive alarm system control. When establishing the accounts for interactive alarm system control, the IPG 220 may be further configured to receive a communications address and access code of the alarm system 200. Particularly, the IPG 220 may query the user for a communications address, such as a telephone number, at which the alarm system 200 may be called to remotely access the alarm system 200. Additionally, IPG 220 may query the user for an access code, PIN, or other information required to access the alarm system 200. In turn, the IPG 220 is configured to associate the communications address and the access code of the alarm system 200 to the account for interactive alarm system control.

Incorporating the operating characteristics, the communications address, and access code of the alarm system 200, the IPG 220 creates a new account for interactive alarm system control for the alarm system 200. Further, as noted above, using the operating characteristics, communications address, and/or access code of the alarm system 200, IPG 220 is configured to determine the appropriate manner in which to remotely access the alarm system 200. For example, based upon the identified operating characteristics of the alarm system 200, the IPG 220 is configured to determine whether remote access to the alarm system 200 is achieved by DTMF tones or modulated signaling of a Bell 103 or 212A standard modem., as discussed above. Further, in certain circumstances, the IPG 220 is able to identify whether the alarm system 200 is remotely accessed via the PSTN 230 or via the data network 240 and the telephone adapter 252. These characteristics for remote access are attributed to the account for interactive alarm system control and are relied upon by the IPG 220 when the user later contacts the IPG 220 for access to the account.

It is noted that the user that establishes the account does not need to be aware of any unique characteristics of the alarm system 200, such the operating characteristics for remote access to the alarm system 200. Instead, the user is able to establish the account for interactive alarm system control with only identifying information that uniquely identifies the alarm system 200. In turn, the IPG 220 stores, in the memory 226, the operating characteristics for various different types of alarms systems and retrieves the operating characteristics of the alarm system identified by the user for association with the account for interactive alarm system control, when account is established.

After an account for interactive alarm system control is established by the IPG 220, the user may use any remote device 210 to communicate with the IPG 220 and send a request for access to the account. Upon the receipt of a request for access to an account for interactive control from a user of a remote device 210, the host 225 of the IPG 220 is configured to serve a web page, electronic document, text message, interactive voice response message, or other similar means to the remote device 210. The remote device 210 is configured to render the page and display an interface to the user requesting access. For example, upon an initial request for access, the host 225 may serve a page with fields requesting a user name and password for access to an account. Upon providing the user name and password, for example, or other authentication parameters from the remote device 210, the information is communicated or submitted to the IPG 220 for authentication. In turn, the IPG 220 is configured to determine whether authentication parameters are valid for the user and/or the account of the user. If not, the engine 224 and the host 225 generate and serve to the remote device 210 a page indicating that the authentication parameters are invalid. Alternatively, if the authentication parameters are valid for an account for alarm system control, the engine 224 and the host 225 generate and serve to the remote device 210 a page providing further access to the account. In this manner, the IPG 220 authenticates the request for access from the remote device 210 based on the received authentication parameters.

While the remote devices 210 may interface and communicate with the IPG 220 using a standard hypertext transfer protocol browser in certain aspects and embodiments, the remote devices 210 may further interface and communicate with the IPG 220 using text messages or an interactive voice response system. For example, the IPG 220 may be configured to rely on text messaging or interactive voice response systems to receive requests for interactive alarm system control. As other examples, the IPG 220 may query an alarm system for its current state and send the current state to a remote device 210 via text message. Additionally, the IPG 220 may forward a confirmation of an update of certain settings of the alarm system to a remote device 210 via text message.

After authenticating the request for access, the engine 224 and host 225 are configured to generate and service additional pages to the remote device 210 for rendering. The pages may provide an overall interface for the account for interactive alarm system control. Using the interface, the user is able to identify the system status of the alarm system 200, for example, and other aspects of the current operating characteristics of the alarm system 200. In certain aspects, according to the pages rendered from the IPG 220, the user is able to identify whether the alarm system 200 is currently armed or disarmed, has triggered into an alarm condition, or has encountered an error condition.

Using various entry fields and/or buttons provided on the pages rendered from IPG 220, as would be understood by one having ordinary skill in the art, a user may submit one or more prompts or instructions to the IPG 220 for remote access and control of the alarm system 200. For example, the user may submit a prompt for a query of the current status of the alarm system 200 to the IPG 220. In turn, the IPG 220 is configured to receive the prompt, determine the appropriate remote access and/or control command for a status query based on the operating characteristics of the alarm system 200, and communicate with the alarm system 200 to query the alarm system 200 for its current status. Based on the appropriate query to the alarm system 200 from the IPG 220, the alarm system 200 provides IPG 220 with its current status. After receiving this current status information from the alarm system 200, the engine 224 and the host 225 are configured to parse the current status information, generate an updated page based on the information, and serve the updated page to the remote device 210 for rendering. Thus, the remote device 210 is able to render the updated page to provide the user with the status of the alarm system 200.

It should be appreciated that, based on the interface provided by the IPG 220, the user of the account for interactive alarm system control of the alarm system 200 does not need to understand the particular operating characteristics or parameters of the alarm system 200. Instead, the user is able to easily view and understand the display rendered based on the pages generated and served by the IPG 220. In certain aspects, the IPG 220 may provide a similar interface format for each account for interactive alarm system control, regardless of the type of alarm system associated with the account. For example, a user may establish and access multiple accounts for interactive alarm system control associated with different alarm systems, each being associated with different types of alarm systems (i.e., different manufacturers, models, etc.). However, each account for interactive alarm system control, when accessed by the user, may display a similar interface layout including a helpful description of available options, entry fields, and buttons for remote access, regardless of the fact that the operating characteristics for remote access are different for different types of alarm systems.

In other aspects, the user of the account for interactive alarm system control may use the remote device 210 to submit a command to control or update the current settings or status of the alarm system 200. For example, using the interface for interactive alarm system control provided by the IPG 220, the user may press one or more buttons, enter commands into one or more fields, or select one or more options to send a command to the alarm system 200 via the IPG 220. In turn, the IPG 220 is configured to receive the command, determine the appropriate remote access and/or control instructions for the command based on the operating characteristics of the alarm system 200, and communicates with the alarm system 200 to instruct the alarm system 200 to perform the command. For example, depending upon the available remote access commands, the instructions may include an instruction to arm, disarm, bypass a zone, un-bypass a zone, abort, or cancel, among others, for example. Based on the command, the alarm system 200 is configured to remotely update at least one of its settings.

In certain aspects and embodiments, after the alarm system 200 remotely updates its settings, a confirmation of the updated settings is communicated by the alarm system 200 to the IPG 220. After receiving this confirmation from the alarm system 200, the engine 224 and the host 225 are configured to parse the confirmation, generate an updated page based on the confirmation, and serve the updated page to the remote device 210 for rendering. Thus, the remote device 210 is able to render the updated page to provide the user with an indication that the settings of the alarm system 200 have been updated.

In view of the description above, it should become apparent that the interfaces provided by the IPG 220 provide users with a simple means to remotely access and interact with alarm systems without the necessity to understand the nuances of the operating characteristics of the systems. Further, the interfaces provided by the IPG 220 provide flexibility in that they may be accessed by various types of remote devices 210 at various locations. It is additionally noted that, rather than being required to understand and adhere to the remote access protocols of an alarm system, a user of an account for remote access provided by the IPG 220 is able to query the status of the alarm system with a minimal number of steps. Similarly, the user is able to update settings of the alarm system with a minimal number of steps. For example, rather than calling the alarm system, hanging up after one ring, waiting ten seconds, calling the alarm system again, waiting for the alarm system to answer, waiting for a modem connection to be established or waiting for another audible prompt, entering an access code, listening for prompts and/or tones that designate an appropriate timing for command submission, submitting a command, and waiting for a confirmation of an update of settings associated with the command, using the IPG 220, a user can simply access his account for interactive remote access and press a button for submitting the command. In turn, the IPG 220 performs all the necessary steps and generates an updated interface or other response for the user, indicating that the command was received by the alarm system and that the alarm system updated its settings.

Also, the IPG 220 is configured to generate and update user interfaces quickly. Especially for alarm systems that rely on modulated signaling of a Bell 103 or 212A standard modem for remote access, communications between the IPG 220 and the alarm systems may require merely a couple seconds after call answer. As opposed to alarm systems configured to allow remote access using DTMF tones generated based on a user's keystrokes on a dial pad, alarm systems that rely on modulated signaling of a Bell 103 or 212A standard modem, for example, cannot be accessed with only a standard telephone handset, wired or wireless. For these types of alarm systems, the IPG 220 provides users with a simple means to remotely access and interact with the systems which may not otherwise be readily available. Moreover, in certain exemplary aspects, the IPG 220 is configured to establish a communications channel with an alarm system via a PSTN interface of the alarm system rather than via a data interface of the alarm system. That is, the IPG 220, using one of the dialers 227, 228, and 229, is configured to communicate with an alarm system over a standard PSTN connection. Because more alarm systems exist (especially legacy alarm system) with PSTN interfaces rather than data interfaces, the IPG 220 is able to communicate with a greater number and wider array of different alarm systems.

Figure 3A:
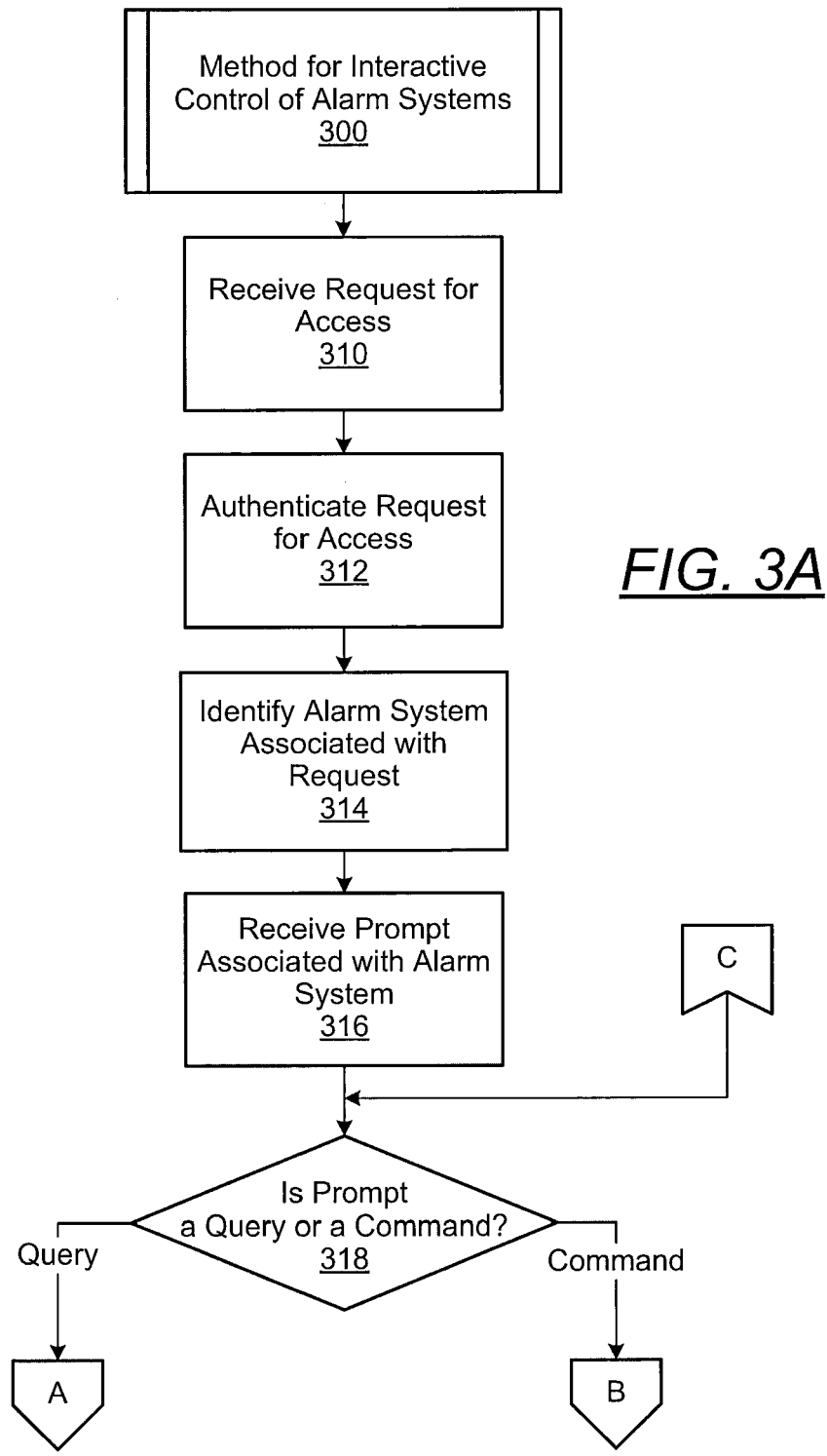
FIG. 3A illustrates an example embodiment of a method for interactive control of an alarm system.
Figure 3B:
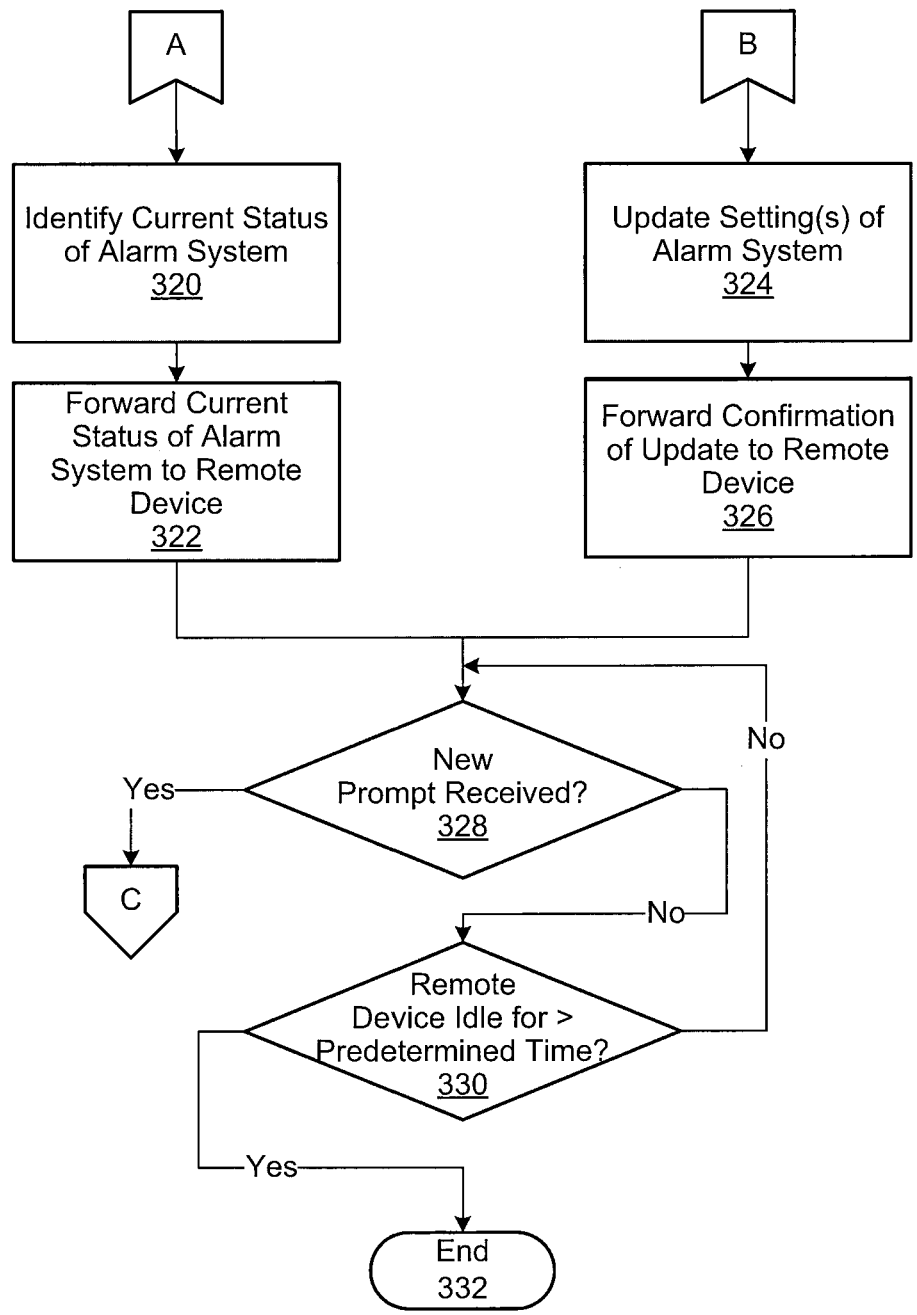
FIG. 3B further illustrates an example embodiment of a method for interactive control of an alarm system.
Figure 4:
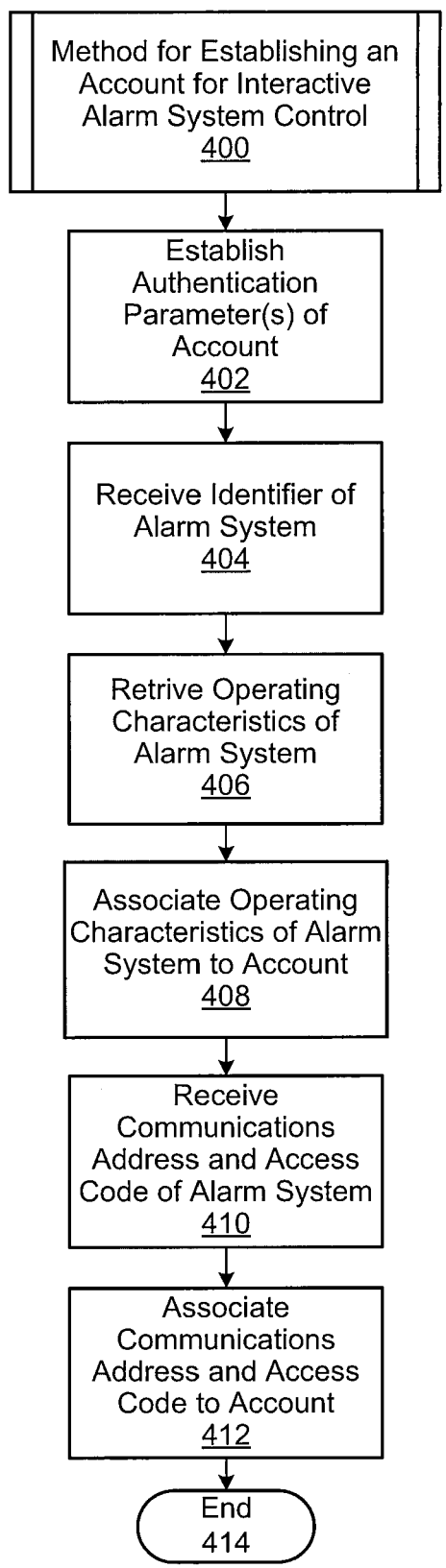
FIG. 4 illustrates an example embodiment of a method for establishing an account for interactive alarm system control.

Before turning to the process flow diagrams of FIGS. 3A, 3B, and 4, it is noted that the present invention may be practiced using an alternative order of the steps illustrated in FIGS. 3A, 3B, and 4. That is, the process flows illustrated in FIGS. 3A, 3B, and 4 are provided as examples only, and the present invention may be practiced using process flows that differ from those illustrated. Additionally, it is noted that not all steps are required in every embodiment. In other words, one or more of the steps may be omitted or replaced, without departing from the spirit and scope of the invention. In alternative embodiments, steps may be performed in different orders, in parallel with one another, or omitted entirely, and/or certain additional steps may be performed without departing from the scope and spirit of the invention.

Turning to FIG. 3A, an exemplary embodiment of a method 300 for interactive control of an alarm system is described. Although the method 300 is generally described with reference to the system 20 and the IPG 220, other systems and similar processing gateways and/or computing devices may be used to perform the process flow illustrated according to the method 300. Beginning at step 310, the method 300 includes receiving a request for access to an account for interactive alarm system control from a remote device. With reference to the system 20 of FIG. 2, the request for access may be received by one of the remote devices 214 or 216, for example. Proceeding to step 312, the method 300 further includes authenticating a request for access from the remote device based on an authentication parameter. For example, as discussed above, before the IPG 220 provides access to the account for interactive alarm system control, a user is generally required to provide an authentication parameter, which may include a username and a password, to the IPG 220 for authentication of the user and the request for access. The IPG 220, after receiving the authentication parameter from the user, is configured to authenticate the request for access based on the parameter.

After authenticating at step 312, the process proceeds to step 314, which includes identifying an alarm system and attributes of the alarm system associated with the request for access. For example, the IPG 220 may identify the alarm system 200 as being associated with the request for access based on the authentication parameter. Additionally, similar to the attributes of the alarm system 200, the operating characteristics of the alarm system are identified at step 314. As noted above, the alarm system 200 and operating characteristics of the alarm system 200 were associated with the account for interactive control when the account was established. In certain exemplary embodiments, this information is stored in the memory 226 for retrieval when a request for access is received.

Proceeding to step 316, the method 300 further includes receiving a prompt associated with the alarm system from the remote device, the prompt comprising one of a query and a command. For example, after a user is provided access to the account for interactive alarm system control, the user is able to send prompts to query or command the alarm system. Further, at step 318, the method 300 includes determining whether the prompt received from the remote device is a query or a command. As discussed above, when receiving a prompt for control, the IPG 220 is configured to receive the prompt, determine the appropriate remote access query or instruction command for the prompt based on the operating characteristics of the alarm system, and communicate with the alarm system to instruct the alarm system to perform the query or command. Thus, as part of the determination as to the appropriate query, instruction, or command for the alarm system based on a received prompt, at step 318, the IPG 220 determines whether the received prompt is a query or a command, so that, the appropriate query, instruction, or command may be determined based on the operating characteristics of the alarm system.

Referring now to FIG. 3B, when the prompt comprises a query, the method 300 proceeds to step 320, which includes identifying a current state of the alarm system. For example, with reference again to FIG. 2, the IPG 220 may communicate with the alarm system 200 via the PSTN interface communications module 206 of the alarm system to query the alarm system 200 for its current status. A part of this query, the IPG 220 may first provide an access code to the alarm system 200, to gain access to the remote access features of the alarm system 200. As noted above, the access code may be retrieved and stored in association with the account for remote access when the account is established. At step 322, the method 300 includes forwarding the current status of the alarm system to the remote device. Here, after receiving a query for the current status of the alarm system 200, the alarm system 200 may provide its current status to the IPG 220. In turn, the engine 224 and the host 225 of the IPG 220 are configured to parse the current status information, generate an updated page based on the information, and serve the updated page to the remote device 210 for rendering.

Proceeding to step 328, the method 300 further includes determining whether a new prompt is received. In this step, for example, the IPG 220 awaits for any further communications from the remote devices 210 and, particularly, awaits for any further queries or commands from the remote devices 210. If a new prompt is received at step 328, the method 300 proceeds back to step 318 where it is determined whether the prompt is a query or a command.

Alternatively, when it is determined at step 318 that a received prompt is a command, the process proceeds to step 324, illustrated in FIG. 3B, which includes updating the settings of the alarm system based on the command. At step 326, the method 300 includes forwarding a confirmation of the update to the remote device. With reference to the system 20 as an example, after determining that a received prompt is a command at step 318, at step 324, the IPG 220 determines the appropriate remote access and/or control instructions for the command based on the operating characteristics of the alarm system 200, and communicates with the alarm system 200 via a PSTN interface of the alarm system to instruct the alarm system 200 to perform the command. A part of this instruction, the IPG 220 may first provide an access code to the alarm system 200, to gain access to the remote access features of the alarm system 200. As noted above, the access code may be retrieved and stored in association with the account for remote access when the account is established.

If, at step 328, it is determined that no new prompt has been received, the process proceeds to step 330, which includes determining whether communications with the remote device have been idle for greater than a predetermined time. That is, in certain embodiments, after a request for access to an account for remote access has been received and authenticated, the authentication remains active for a predetermined amount of time. During this predetermined amount of time, the IPG 220 awaits for prompts for remote access. However, if the predetermined time lapses or, for example, if a connection to a remote device that requested access to the account is lost, the authentication is considered by the IPG 220 to be revoked until another authentication occurs. Thus, if a remote device is inactive on an account for greater than a predetermined time, the process proceeds to step 332, where the method 300 ends.

Turning to FIG. 4, an example embodiment of a method 400 for establishing an account for interactive alarm system control is described. At step 402, the method 400 includes establishing authentication parameters for the account. In other words, as one example of authentication parameters, a user provides a username and a password. These parameters are associated with the account and stored for future reference. At step 404, the method 400 includes receiving a model identifier of the alarm system. As noted above, the model identifier may be an identifying model number, serial number, or other manufacturer model number that identifies an alarm system to be associated with the account. After the model of the alarm system is identified, the method 400 proceeds to step 406, which includes retrieving operating characteristics of the identified alarm system based on the model identifier of the alarm system received at step 404.

At step 408, the method 400 includes associating the operating characteristics of the alarm system to the account for interactive alarm system control. Proceeding to step 410, the method 400 includes receiving a communications address and an access code of the alarm system, and, at step 412, associating the communications address and the access code of the alarm system to the account for interactive alarm system control. Particularly, the communications address may comprise a telephone number at which the alarm system may be contacted, and the access code may comprise a PIN number that must be provided to the alarm system to gain access to its status and settings.

Figure 5:
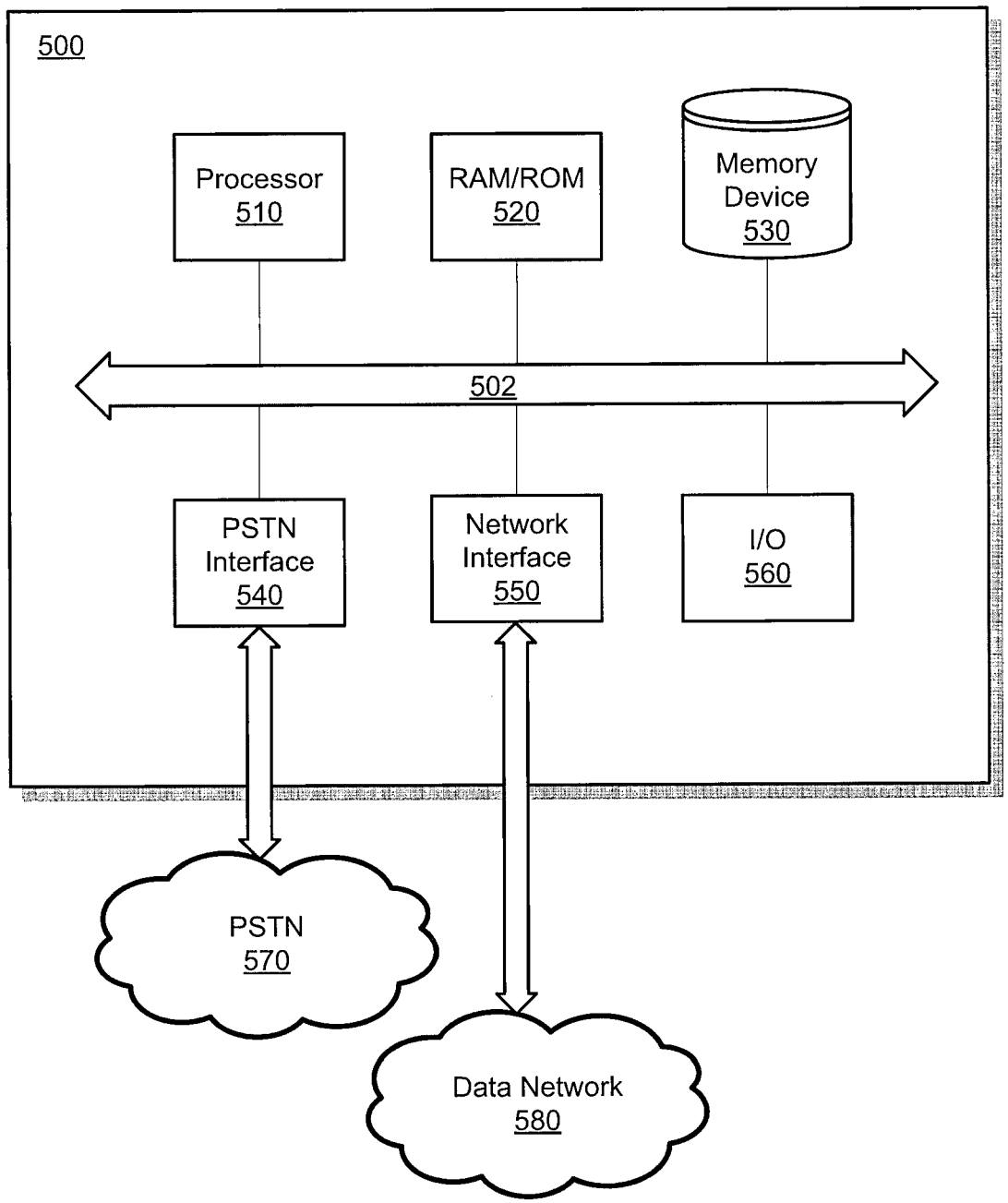
FIG. 5 illustrates a general purpose computer according to certain aspects of the embodiments described herein.

Turning to FIG. 5, an example hardware diagram of a general purpose computer 500 is described. The IPG 220 may be implemented, in part, using one or more elements of the general purpose computer 500. The computer 500 includes a processor 510, a Random Access Memory ("RAM")/Read Only Memory ("ROM") 520, a memory device 530, a PSTN interface 540, a network interface 550, and an Input Output ("I/O") interface 560. The elements of the computer 500 are communicatively coupled via a bus 502.

The processor 510 comprises any well known general purpose arithmetic processor or Application Specific Integrated Circuit ("ASIC"). The RAM/ROM 520 comprises any well known random access or read only memory device that stores computer-readable instructions to be executed by the processor 510. The memory device 530 stores computer-readable instructions thereon that, when executed by the processor 510, direct the processor 510 to execute various aspects of the present invention described herein. When the processor 510 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 530 comprises one or more of an optical disc, a magnetic disc, a semiconductor memory (i.e., a flash based memory), a magnetic tape memory, a removable memory, combinations thereof, or any other known memory means for storing computer-readable instructions. The PSTN interface 540 and the network interface 550 comprise hardware interfaces to communicate over the PSTN and data networks, respectively. The I/O interface 560 comprises device input and output interfaces such as keyboard, pointing device, display, communication, and other interfaces. The bus 502 electrically and communicatively couples the processor 510, the RAM/ROM 520, the memory device 530, the PSTN interface 540, the network interface 550, and the I/O interface 560, so that data and instructions may be communicated among them. In operation, the processor 510 is configured to retrieve computer-readable instructions stored on the memory device 540, the RAM/ROM 520, or another storage means, and copy the computer-readable instructions to the RAM/ROM 520 for execution. The processor 510 is further configured to execute the computer-readable instructions to implement various aspects and features of the present invention. For example, the processor 510 may be adapted and configured to execute the processes described above with reference to FIGS. 3A, 3B, and 4, including the processes described as being performed according to the configuration of the IPG 220.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method for interactive alarm system control, comprising:
    providing an intermediate processing gateway that provides a common interface between a plurality of remote devices and a plurality of alarm systems,
        wherein the plurality of remote devices are disposed at different locations that are remote from the intermediate processing gateway,
        wherein the plurality of remote devices comprises a cellular telephone, a computer, and tablet computing device,
        wherein each remote device in the plurality of remote devices is capable of providing access to websites and e-mail over a packet-based network,
        wherein the plurality of alarm systems are disposed at other different locations that are remote from the intermediate processing gateway, and
        wherein the plurality of alarm systems use different remote access protocols;
    receiving, by the intermediate processing gateway, a model identifier of an alarm system in the plurality of alarm systems;
    retrieving, by the intermediate processing gateway, operating characteristics of the alarm system based on the model identifier of the alarm system;
    associating, by the intermediate processing gateway, the operating characteristics of the alarm system to an account for interactive alarm system control;
    receiving, by the intermediate processing gateway, a request for access to the account for interactive alarm system control from a remote device in the plurality of remote devices;
    authenticating, by the intermediate processing gateway, the request for access from the remote device based on an authentication parameter;
    after the authenticating, identifying, by the intermediate processing gateway, the alarm system and the operating characteristics of the alarm system associated with the request for access, wherein the alarm system is configured to detect an alarm event using one or more sensors and communicate associated alarm event data to a central alarm monitoring system or service;
    receiving, by the intermediate processing gateway, a prompt associated with the alarm system from the remote device, the prompt comprising one of a query and a command; and
    communicating, by the intermediate processing gateway, with the alarm system via a PSTN interface of the alarm system according to the identified operating characteristics of the alarm system and in response to the prompt, to query or update at least one setting of the alarm system.

2. The method of claim 1, further comprising,
    when the prompt comprises a query, communicating, by the intermediate processing gateway, with the alarm system via the PSTN interface of the alarm system to identify a current state of the alarm system; and
    forwarding, by the intermediate processing gateway, the current state of the alarm system to the remote device.

3. The method of claim 2, wherein the current state includes at least one of an armed-state and an alarm-state.

4. The method of claim 1, further comprising,
    when the prompt comprises a command, instructing, by the intermediate processing gateway, the alarm system to update the at least one setting of the alarm system via the PSTN interface of the alarm system; and
    forwarding, by the intermediate processing gateway, a confirmation of the update of the at least one setting of the alarm system.

5. The method of claim 4, wherein instructing the alarm system to update the at least one setting comprises instructing to arm, disarm, bypass a zone, un-bypass a zone, abort, or cancel.

6. The method of claim 1, further comprising
    determining, by the intermediate processing gateway, whether a new prompt has been received; and
    if no new prompt has been received, determining whether communications with the remote device have been idle for greater than a predetermined time.

7. The method of claim 1, further comprising:
    receiving, by the intermediate processing gateway, a communications address and an access code of the alarm system; and
    associating, by the intermediate processing gateway, the communications address and the access code of the alarm system to the account for interactive alarm system control.

8. The method of claim 1, wherein the authentication parameter comprises a username and a password.

9. The method of claim 1, wherein communicating with the alarm system according to the identified operating characteristics of the alarm system comprises:
    contacting, by the intermediate processing gateway, the alarm system via the PSTN interface;
    establishing a DTMF, modem, or other connection; and
    providing an access code.

10. The method of claim 1, wherein the remote device interfaces with the intermediate processing gateway by a standard hypertext transfer protocol browser, text messaging, or voice prompt.

11. A gateway for interactive alarm system control, comprising:
a communications module configured to receive, from a remote device, a request for access to an account for interactive alarm system control and a prompt associated with an alarm system, the prompt comprising one of a query and a command; and
a processor configured to
receive a model identifier for the alarm system,
retrieve operating characteristics of the alarm system based on the model Identifier,
associating the operating characteristics of the alarm system to the account for interactive alarm system control,
authenticate the request for access from the remote device based on an authentication parameter,
after the authentication, identify the alarm system associated with the request for access, and
direct the communications module to communicate with the alarm system via a PSTN interface of the alarm system according to the operating characteristics of the alarm system and in response to the prompt, to query or update at least one setting of the alarm system,
wherein the remote device is one of a plurality of remote devices disposed at different places that are remote from the gateway,
wherein the alarm system is one of a plurality of alarm systems that are disposed at different locations that are remote from the gateway and from the different places of the remote devices,
wherein the plurality of alarm systems use different remote access protocols,
wherein the gateway provides a common interface between the plurality of remote devices and the plurality of alarm systems,
wherein each remote device in the plurality of remote devices is capable of providing access to websites and e-mail over a packet-based network,
wherein the remote device comprises a smart-phone.

12. The gateway of claim 11, wherein the processor is further configured to,
when the prompt comprises a query, direct the communications module to communicate with the alarm system via the PSTN interface of the alarm system to identify a current state of the alarm system, and
forward the current state of the alarm system to the remote device.

13. The gateway of claim 12, wherein the current state includes at least one of an armed-state and an alarm-state.

14. The gateway of claim 11, wherein the processor is further configured to,
when the prompt comprises a command, direct the communications module to instruct the alarm system to update the at least one setting of the alarm system via the PSTN interface of the alarm system, and
forward a confirmation of the update of the at least one setting of the alarm system.

15. The gateway of claim 14, wherein the processor is further configured to, when the prompt comprises a command, instruct the alarm system to arm, disarm, bypass a zone, un-bypass a zone, abort, and cancel.

16. The gateway of claim 11, wherein the processor is further configured to
determine whether a new instruction has been received, and
if no new instruction has been received, determine whether communications with the remote device have been idle for greater than a predetermined time.

17. The gateway of claim 11, wherein the processor is further configured to
receive a communications address and an access code of the alarm system, and
associate the communications address and the access code of the alarm system to the account for interactive alarm system control.

18. The gateway of claim 11, wherein the authentication parameter comprises a username and a password.

19. The gateway of claim 11, wherein the remote device interfaces with the gateway by a standard hypertext transfer protocol browser, text messaging, or voice prompt.

20. A method for interactive alarm system control, comprising:
providing, with a gateway, a common interface between a plurality of remote devices and a plurality of alarm systems, the plurality of remote devices disposed at different locations that are remote from the gateway, the plurality of alarm systems disposed at other different locations that are remote from the gateway, each remote device in the plurality of remote devices capable of providing access to websites and e-mail over a packet-based network, the plurality of alarm systems using different remote access protocols;
establishing an account for interactive alarm system control, comprising:
receiving, by the gateway, a model identifier of the alarm system;
retrieving, by the gateway, operating characteristics of the alarm system based on the model identifier of the alarm system; and
associating, by the gateway, the operating characteristics of the alarm system to the account for interactive alarm system control;
authenticating, by the gateway, a request for access to the account for interactive alarm system control from a remote device in the plurality of remote devices and identifying attributes of the alarm system in the plurality of alarm systems associated with the request for access, the attributes comprising the operating characteristics;
receiving, by the gateway, a prompt associated with the alarm system from the remote device, the prompt comprising one of a query and a command; and
communicating, by the gateway, with the alarm system via a PSTN interface of the alarm system according to the identified attributes of the alarm system and in response to the prompt, to query or update at least one setting of the alarm system.

21. The method of claim 20, further comprising,
when the prompt comprises a query, communicating, by the gateway, with the alarm system via the PSTN interface of the alarm system to identify a current state of the alarm system; and
forwarding, by the gateway, the current state of the alarm system to the remote device.

22. The method of claim 20, further comprising,
when the prompt comprises a command, instructing, by the gateway, the alarm system to update the at least one setting of the alarm system via the PSTN interface of the alarm system; and forwarding, by the gateway, a confirmation of the update of the at least one setting of the alarm system.

23. The method of claim 20, further comprising determining, by the gateway, whether a new prompt has been received; and if no new prompt has been received, determining whether communications with the remote device have been idle for greater than a predetermined time.

\* \* \* \* \*